United States Patent [19]
Matsushita

[11] 4,448,840
[45] May 15, 1984

[54] METHOD FOR MANUFACTURING A RUBBER SHEET WHICH IS ELECTRICALLY INSULATING AND THERMALLY RADIATING AND RUBBER SHEETS MADE THEREFROM WITH IMPROVE RESISTANCE TO FLEXURAL FATIGUE

[75] Inventor: Takao Matsushita, Kisarazu, Japan

[73] Assignee: Toray Silicone Company, Ltd., Tokyo, Japan

[21] Appl. No.: 503,933

[22] Filed: Jun. 13, 1983

[30] Foreign Application Priority Data

Jun. 14, 1982 [JP] Japan ................................ 57-101896

[51] Int. Cl.$^3$ ........................... B32B 7/00; B05D 1/36
[52] U.S. Cl. .................................... 428/266; 252/567; 252/573; 427/407.1; 427/407.3; 427/412; 428/246; 428/251; 428/268; 428/271; 428/273; 428/429; 428/443; 428/447
[58] Field of Search .................. 252/567, 573; 427/82, 427/387, 389.8, 393.6, 407.3, 412, 407.1; 428/620, 266, 268, 246, 251, 271, 273, 429, 443, 447

[56] References Cited

U.S. PATENT DOCUMENTS

| | | | |
|---|---|---|---|
| 3,021,292 | 2/1962 | Hurd et al. | 252/573 X |
| 3,161,614 | 12/1964 | Brown et al. | 252/573 X |
| 3,373,049 | 3/1968 | Nitzsche et al. | 427/407.3 X |
| 3,498,824 | 3/1970 | Chadha | 427/407.3 X |
| 4,177,322 | 12/1979 | Homan et al. | 252/573 X |
| 4,265,775 | 5/1981 | Aakalu et al. | 252/573 |

FOREIGN PATENT DOCUMENTS 0849885 9/1960 United Kingdom ................ 252/573

Primary Examiner—Thurman K. Page
Attorney, Agent, or Firm—Roger H. Borrousch

[57] ABSTRACT

A silicone rubber sheet which is both electrically insulating and thermally radiating is prepared by treating a network insulating material, such as glass fabric, with an alkoxysilane and then coating the resulting network insulating material with a fluid silicone rubber composition of an aliphatically unsaturated polyorganosiloxane, a polyorganohydrogensiloxane, alumina powder, and a platinum-group compound catalyst. The rubber sheets have improved bending resistance.

19 Claims, No Drawings

METHOD FOR MANUFACTURING A RUBBER SHEET WHICH IS ELECTRICALLY INSULATING AND THERMALLY RADIATING AND RUBBER SHEETS MADE THEREFROM WITH IMPROVE RESISTANCE TO FLEXURAL FATIGUE

BACKGROUND OF THE INVENTION

1. Field of the Invention

This invention relates to a method for manufacturing a rubber sheet having electrically insulating properties and thermally radiating properties.

2. Description of the Prior Art

Heat-producing electronic components such as power transistors or thyristors usually generate heat in their operation. As a result, when these electronic components are used for a long period of time, their properties deteriorate due to the heat and they occasionally fail. For this reason, an electric-insulting and radiating sheet which exhibits both electric insulation properties and thermal conductivity is placed between the above-mentioned heat-producing electronic parts and constructed with radiator fins (or metal radiator plates) in order to provide the heat-producing electronic part in such a way that the heat generated will be radiated.

Conventional radiating sheets are usually mica or a polyester film coated with grease. However, the grease can evaporate and is degraded in long-term use with the result that its radiating characteristics tend to degrade and it causes complications in operation. In addition, mica and polyimide films are hard and their surfaces are not adhesive. These are the drawbacks of conventional radiating sheets.

It is known that a silicone rubber radiating sheet alone has recently been used without the use of grease. However, this thin silicone rubber radiating sheet exhibited the drawback of low mechanical strength with the result that it presented problems such as tearing during installation. For this reason, the use of glass cloth has been proposed to reinforce the above-mentioned sheet to give high reliability. A conventional method for the production of an insulating and radiating rubber sheet reinforced with such a network insulating material (glass cloth) is to dip the network material into a non-fluid (solid) peroxide-vulcanized silicone rubber compound dissolved in a large amount of solvent and the compound cured to a radiating rubber. However, the nonfluid rubber compound is not very soluble and a long time is required for dissolution and the solid component concentration in the resulting solution is low. Due to this, the number of immersions must be increased and the process becomes very complicated. Furthermore, this process poses safety and hygiene problems due to the use of a large amount of an organic solvent. Also, the above-mentioned insulating and radiating rubber sheet exhibits the drawback of ready peeling of the silicone rubber from the network insulating material under repeated flexural loading.

SUMMARY OF THE INVENTION

This invention provides a new production method which does not exhibit the above-mentioned drawbacks and problems. A fluid addition reaction-curable silicone rubber composition is coated on a network insulating material which is first treated with an alkoxysilane and subsequently cured in order to effectively produce an electrically insulating and a thermally radiating rubber sheet which exhibits high strength and resistance to flexing failure.

This invention relates to a method for manufacturing a rubber sheet which is electrically insulating and thermally radiating, comprising treating a network insulating material with an alkoxysilane, then coating the resulting network insulating material with a fluid silicone rubber composition and then curing said composition, where the fluid silicone rubber composition consists essentially of (a) 100 parts by weight of a polyorganosiloxane having a viscosity at 25° C. of from 0.1 to 100 Pa·s and having an average unit formula

wherein each R represents a monovalent hydrocarbon radical free of aliphatic unsaturation or a halogenated monovalent hydrocarbon radical free of aliphatic unsaturation, each R' represents a monovalent aliphatically unsaturated hydrocarbon radical, a has a value from 1.90 to 2.05, b has a value from 0.005 to 0.1, and the sum of a+b has a value from 1.91 to 2.06, (b) a polyorganohydrogensiloxane having a viscosity at 25° C. of 0.0007 to 5 Pa·s and having an average unit formula

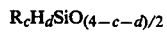

wherein R is defined above, the sum of c+d has a value of 1.001 to 3, there is at least two silicon-bonded hydrogen atoms per molecule, and said polyorganohydrogensiloxane is present in an amount such that there are 0.5 to 10 equivalents of silicon-bonded hydrogen atoms per equivalent of aliphatically unsaturated hydrocarbon radical in (a), (c) from 100 to 500 parts by weight of alumina powder, and (d) a catalytic quantity of a platinum-group compound as a catalyst.

DETAILED DESCRIPTION OF THE INVENTION

Component (a) is crosslinked with component (b) in the presence of component (d) as a catalyst to form an elastomer. Examples of the silicon-bonded R in the average unit formula are monovalent hydrocarbon radicals such as alkyl radicals, such as methyl, ethyl, propyl, butyl, octyl, and cyclohexyl; aryl radicals such as phenyl and tolyl and halogenated monovalent hydrocarbon radicals such as halogenated alkyl radicals such as 3-chloropropyl and 3,3,3-trifluoropropyl. Examples of R' are monovalent aliphatically unsaturated hydrocarbon radicals such as vinyl, allyl, and 3-butenyl. The silicon atoms of this component may be bonded to extremely small amounts of other subsituents such as hydroxyl and alkoxy in addition to R and R'. Example of siloxane units comprising this component are $RR'SiO_{2/2}$, $R_2SiO_{2/2}$, $RSiO_{3/2}$, $R'SiO_{3/2}$, $R_2R'SiO_{1/2}$, $RR_2'SiO_{1/2}$, and $SiO_{4/2}$. The molecular configuration of this component is usually straight chain; however, it may be partially branched. The aliphatically unsaturated hydrocarbon radicals of R' may be present at the molecular chain ends or as side chains or at both locations. These R' are preferably present at the terminals from the standpoints of improved postcure mechanical properties. In a single molecule, R and R' may each consist of a single type or may each consist of a mixture of two or more types. The polyorganosiloxanes of this composition may comprise a single type or a mixture of two or more types. Both the crosslinking density which can be varied by appropriately varying the mixing ratio of relatively low viscous polyorganosiloxane and relatively high viscous polyorganosiloxane and the quantity of inorganic filler are appropriately selected to satisfy the hardness specified for the cured silicone rubber. The desired product hardness can thus be advantageously obtained. The viscosity of the polyorganosiloxane, regardless of whether it is a single type or a mixture of two or more types, is usually 0.1 to 100 Pa·s and preferable 0.2 to 50 Pa·s on average at 25° C.

Component (b) plays the role of crosslinking agent for component (a). Examples of the R groups directly bonded to silicon in this component are the same as for the R groups of component (a) and the R groups may be identical to the R groups of component (a). Examples of the siloxane units constituting this component are $RHSiO_{2/2}$, $R_2SiO_{2/2}$, $RSiO_{3/2}$, $HSiO_{3/2}$, $R_3SiO_{1/2}$, $R_2HSiO_{1/2}$, and $SiO_{4/2}$.

This polyorganohydrogensiloxane may take the form of a straight chain, branched chain, network, or ring; however, a straight chain or ring is preferred. The R groups in each molecule may be a single type or a mixture of two or more types. The polyorganohydrogensiloxane may be a single type or a mixture of two or more types. The silicon-bonded hydrogen atoms may be located at the molecular chain ends or along the chain or at both of these two locations. In order to cure component (a), the quantity of silicon-bonded hydrogen atoms must be 0.5 to 10 equivalents per 1 equivalent of the aliphatically unsaturated hydrocarbon radical of component (a). The viscosity of component (b) is 0.0007 to 5 Pa·s at 25° C.

The alumina powder comprising component (c) is expressed by the chemical formula $Al_2O_3$ and is indispensable for imparting a high thermal conductivity and moderate viscosity and thickness to the silicone rubber composition of this invention. A typical alumina which is useful in this invention is the well-known calcined alumina ($\alpha$-alumina) which can be produced by grinding a pulverizing the $\alpha$-alumina produced by the heat treatment of aluminum hydroxide at elevated temperatures.

The alumina to be used in the composition of this invention is desirably in the form of an extremely fine powder such as a particle size of $\leq 50\mu$. The quantity of addition is 100 to 500 parts by weight and preferably 200 to 350 parts by weight per 100 parts by weight of component (a). When this quantity is less than 100 parts by weight, the resulting radiating sheet does not exhibit an adequate thermal conductivity. On the other hand, when the above-mentioned quantity exceed 500 parts by weight, the resulting silicone rubber composition does not exhibit a satisfactory fluidity and, moreover, the vulcanized silicone rubber sheet suffers from degraded mechanical properties.

The platinum-group compound catalyst to be used by the method of this invention as component (d) is a catalyst for the addition reaction of the silicon-bonded aliphatically unsaturated hydrocarbon radicals in component (a) with the silicon-bonded hydrogen atoms of component (b). The platinum-group compound as defined in this text is the individual platinum group metal and its compounds. It includes extremely fine platinum powder, extremely fine platinum powder adsorbed on a carbon powder carrier, chloroplatinic acid, alcohol-modified products of chloroplatinic acid, platinum chelates, chloroplatinic acid-olefin coordination products, chloroplatinic acid-vinylsiloxane coordination products, and similar metal compounds of palladium, rhodium, iridium, ruthenium, and osmium. Of these catalysts, platinum compound catalysts are preferred. The quantity of addition of platinum-group compound catalyst is 1 to 800 ppm as platinum-group metal based on the combined quantities of components (a) to (c).

The fluid silicone rubber to be used by the method of this invention can be produced by blending the above-mentioned four components (a), (b), (c), and (d) to homogeneity. The mixer to be employed is arbitrary as long as the powder can be poured into and mixed with the liquid; however, it is preferable that the mixture be agitated under high shear forces. Because a mixture of components (a), (b), and (d) immediately begins to cure as soon as these components are mixed with each other, these three components should be mixed with each other immediately before molding. An addition-reaction inhibitor such as an organonitrogen compound, acetylene compound, or tin compound may be added to the above-mentioned composition to suppress the above-mentioned curing reaction from the standpoint of ease of operation. As necessary, an additional thermally conductive filler such as zinc oxide, and boron nitride and other materials such as fine quartz powder, reinforcing silica fillers, heat stabilizers, flame retardants, or pigments can be added.

The network insulating material includes woven fabrics, knits, nonwoven fabrics, and laminated products of these materials and may be any type as long as the material exhibits electric insulation. However, it should exhibit a good thermal conductivity and also exhibit a heat resistance in balance with the heat resistance of the silicone rubber. Examples are glass fibers, asbestos, and silicon carbide fibers.

The network insulating material should be treated with an alkoxysilane in advance. The alkoxysilane includes tetraalkoxysilanes, organotrialkoxysilane, diorganodialkoxysilanes, and the partial condensation products of these silanes.

Examples of the alkoxysilanes are vinyltrimethoxysilane, vinyltriethoxysilane, vinyltris($\beta$-methoxyethoxy)silane, $\gamma$-methacryloxypropyltrimethoxysilane, $\gamma$-methacryloxypropyltriethoxysilane, $\gamma$-acryloxypropyltriethoxysilane, allyltrimethoxysilane, allyltriethoxysilane, $\gamma$-glycidoxypropyltrimethoxysilane, $\beta$-(3,4-epoxycyclohexyl)ethyltrimethoxysilane, tetramethoxysilane, tetraethoxysilane, tetrapropoxysilane, tetrabutoxysilane, and mixtures of these silanes.

In addition, an organotitanic acid ester is preferably used with the alkoxysilane in order to impart to the alkoxysilane rapid curing or rapid drying under the ambient atmosphere and increase the adhesion of the silicone rubber to the network insulating base material. Examples of the organotitanic acid ester are tetraisopropyl titanate, tetra-n-butyl titanate, butyl titanate dimer, tetra(2-ethylhexyl) titanate, diethoxytitanium bis(acetylacetonate), and titanium diacetylacetonate.

The network insulating material is treated with the alkoxysilane or alkoxysilane-organotitanic acid ester mixture by dipping or spraying with a 5 to 30 wt % organic solvent solution and then drying at temperatures ranging from room temperature to 100° C. under ambient atmosphere.

When the fluid silicone rubber composition composed of the above-mentioned components (a) through (d) is coated on the alkoxysilane treated network insulating material and then cured at room or elevated temperature, an electrically insulating and thermally radiating rubber sheet is produced.

The fluid silicone rubber composition is preferably coated on both surfaces of the network insulating material. The coating method is arbitrary; however, a preferred coating method is a doctor-blade method in which coating is carried out under an extremely low pressure.

The fluid silicone rubber composition can be efficiently cured at elevated temperatures of 70° to 180° C. by either press vulcanization or hot-air vulcanization; however, in a preferred process a fluid silicone rubber composition which has been coated by a doctor blade is passed continuously through a heating oven.

With the addition of a small quantity of an organic solvent which exhibits an affinity for component (a) or (b) prior to coating the fluid silicone rubber on the network insulating material which was first treated with the alkoxysilane, doctor-blade coating can be smoothly carried out. Moreover, dip coating can also be smoothly carried so that the electrical insulating and thermal radiating rubber sheet can be manufactured with only a few immersions and a subsequent curing process. The organic solvent to be used includes toluene, xylene, halogenated hydrocarbons such as 3,3,3-trichloroethane and tetrachloroethylene, acetone, and methyl ethyl ketone and the quantity should be 1 to 20 wt% of the silicone rubber composition.

When a small quantity of the above-mentioned organic solvent is added to the silicone rubber composition, the silicone rubber composition would be heated at a relatively low temperature in order to evaporate the organic solvent and then completely cured by heating at a higher temperature.

According to the method of production of this invention, an electric insulating and thermal radiating rubber sheet of higher strength and resistance to flexing failure can be efficiently manufactured.

The electrically insulating and thermally radiating rubber sheet produced by the production method of this invention not only exhibits high strength because the silicone rubber has thoroughly penetrated into and become unified with the network insulating material, but also does not suffer from peeling of the silicone rubber from the network insulating material even with repeated flexural loading of the sheet. Also, its thermal radiative property does not decline even in the presence of the network insulating material. These characteristics can be further improved by the preliminary addition of a small amount of an organic solvent to the fluid silicone rubber composition.

The electrically insulating and thermally radiating rubber sheet produced by the method of this invention may be optionally cut into pieces of the desired shape and then installed between the heat-producing electronic component and a radiator fin (or metal radiator plate) with the result that the heat generated by the electronic component can be efficiently radiated.

This invention will be explained using demonstrational example. "Parts" in the examples denotes "parts by weight" and the physical properties such as the viscosity were all measured at 25° C.

The viscosity was measured using a BH rotary viscometer and the tensile strength, volume resistivity, and breakdown strength were measure by the methods of JIS K 6301. The dissolution time as defined in this text is the time required for the dissolution to homogeneity of the silicone rubber composition. The thermal resistivity was measured by attaching a TO-3 power transistor to a radiator via an insulating and radiating rubber sheet of this invention, and the units °C./w are degree centigrade per watt. The bending resistance was measured by flexing the rubber sheet 5,000 times on an MIT flexural fatigue tester and subsequently inspecting interfacial peeling between the glass cloth and silicone rubber with the unaided eye.

EXAMPLE 1

120 Parts of a methylphenylvinylsilyl-terminated dimethylsiloxane-methylvinylsiloxane-methylphenylsiloxane copolymer (siloxane unit monomer molar ratio 94.7:0.3:5.0 respectively dimethylsiloxane units:methylvinylsiloxane units:methylphenylsiloxane units; viscosity, 10 Pa·s) was combined with 250 parts $\alpha$-alumina (2.2$\mu$ average particle size), 1.5 parts tetramethyltetrahydrogencyclotetrasiloxane as the crosslinking agent, choroplatinic acid ($H_2PtCl_6 \cdot 6H_2O$, 11 ppm platinum based on the whole quantity), and 0.06 part benzotriazole as the addition-reaction inhibitor. The resulting mixture was blended to homogeneity to obtain a fluid silicone rubber composition (I) (viscosity, 1,500 Pa·s).

A glass cloth was dipped in a 10% xylene solution of $\gamma$-methacryloxypropyltrimethoxysilane and then dried at room temperature for 60 minutes. This alkoxysilane-treated glass cloth was designated as glass cloth A.

The fluid silicone rubber composition (I) was coated, either directly or optionally diluted with toluene, on one side of a glass cloth A (thickness, 0.2 mm) using a doctor blade and then was continuously moved through a heating oven at 130° C. for hot-air vulcanization with a residence time of 5 minutes. Composition (I) was then similarly coated on the other side of the glass cloth A and subsequently hot-air vulcanized. The composition containing toluene was heated by warm air at 30° to 40° C. in order to evaporate the toluene and then hot-air vulcanized at 130° C. As comparison Example 1, a conventional insulating and radiating rubber sheet was produced by pouring fluid silicone rubber composition (I) into a 0.31 mm deep mold, smoothing the surface with a doctor blade and subsequently hot-air vulcanizing at 130° C. for 5 minutes.

The data on the production method and the properties of the insulating and radiating rubber sheet are both reported in Table 1.

TABLE 1

|  | This Invention Example 1 | | Comparison Example 1 |
| --- | --- | --- | --- |
| Fluid silicone rubber composition (I) (parts) | 100 | 97 | 100 |
| Toluene (parts) | — | 3 | — |
| Viscosity, Pa.s | 1100 | 100 | 1100 |
| Dissolution time (hrs) | — | instant | — |
| Coatability | good | good | — |
| Rubber sheet thickness (mm) | 0.30 | 0.30 | 0.30 |
| Coating operations (times per surface) | 1 | 2 | — |
| Tensile strength (kg/25 mm width) | 30 | 31 | 0.10 |
| Bending resistance | No peeling | No peeling | — |
| Volume resistivity (ohm-cm) | $2.3 \times 10^{14}$ | $2.4 \times 10^{14}$ | $1.8 \times 10^{14}$ |
| Breakdown voltage (kV) | 8 | 9 | 8 |
| Thermal resistivity °C./w | 0.86 | 0.85 | 0.78 |

EXAMPLE 2

A dimethylvinylsilyl-terminated polydimethylsiloxane (120 parts; vinyl group content, 0.30 wt%; viscosity, 2 Pa·s) was combined and then kneaded with a fumed silica (20 parts; BET surface area, 200 m²/g) and hexamethyldisilazane (7 parts) at an elevated temperature. The resulting base compound was combined with α-alumina (250 parts; average particle size, 2.2μ), a polymethylhydrogensiloxane (4.6 parts; viscosity, 0.007 Pa·s) with the general formula

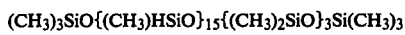

$(CH_3)_3SiO\{(CH_3)HSiO\}_{15}\{(CH_3)_2SiO\}_3Si(CH_3)_3$ as the crosslinker, methylvinylsiloxane-chloroplatinic acid complex (20 ppm platinum based on the whole quantity) as the addition-reaction catalyst and 3,5-dimethyl-1-hexyn-3-ol as the addition-reaction inhibitor. The resulting mixture was blended to homogeneity in order to obtain fluid silicone rubber composition (II) (viscosity, 300 Pa·s).

A glass cloth was dipped in a 15% xylene solution of a vinyltrimethoxysilane-tetrabutyltitanate mixture and then dried at 80° C. under ambient atmosphere for 15 minutes to give glass cloth B.

The resulting fluid silicone rubber composition (II) was coated, directly or optionally diluted with xylene, on one surface of a glass cloth B (thickness, 0.1 mm) using a doctor blade and then continuously moved through a heating oven for hot-air vulcanization at 150° C. with a residence time of 3 minutes. Composition (I) was then coated on the other surface of the glass cloth by the same method as above and subsequently hot-air vulcanized. The composition containing xylene was treated with warm air at 30° to 40° C. in order to evaporate the xylene and was then hot-air vulcanized at 150° C. For the Comparison Example 2, a conventional insulating and radiating rubber sheet was manufactured by pouring fluid silicone rubber composition (II) into a 0.21 mm deep mold, smoothing the surface with a doctor blade and then hot-air vulcanizing at 150° C. for 3 minutes. The data on the production process and properties of the electrically insulating and thermally radiating rubber sheet products are reported in Table 2.

COMPARISON EXAMPLES 3-5

An polyorganosiloxane gum (100 parts; degree of polymerization, 5000; dimethylsiloxane units, 99.84 mol %; methylvinylsiloxane units, 0.16 mol %) was combined with a hydroxyl terminated polydimethylsiloxane (7.0 parts; viscosity at 25° C., 0.00004 m²/s) and a fumed silica (20 parts; BET surface area, 200 m²/g) as a reinforcing filler. The resulting mixture was heated while being kneaded. The mixture was combined with α-alumina (250 parts; average particle size, 2.2μ) and benzoyl peroxide (4.0 parts) as the vulcanizing agent and then kneaded on a two-roll to homogeneity. A nonfluid (solid) silicone rubber composition (III) was thus produced.

Since nonfluid (solid) silicone rubber composition (III) could not be directly coated on a glass cloth (thickness, 0.1 mm) using a doctor blade, it was dissolved in and diluted with xylene. The resulting solution was coated on a glass cloth by the method of Example 1 and subsequently hot-air vulcanized to obtain an insulating and radiating rubber sheet. The data on the production process and the properties of the insulating and radiating rubber sheet product are shown in Table 3.

TABLE 3

| | Comparison Example 3 | Comparison Example 4 | Comparison Example 5 |
|---|---|---|---|
| Non fluid silicone rubber composition (III) (parts) | 100 | 50 | 30 |
| Xylene (parts) | — | 50 | 70 |
| Viscosity, Pa.s | — | 10000 | 200 |
| Dissolution time (hrs) | — | 5-10* | 5* |
| Coatability | poor | poor | good |
| Rubber sheet thickness (mm) | rubber sheet could not be formed | rubber sheet could not be formed | 0.20 |
| Coating operations (times per surface) | — | — | 6 |
| Tensile strength (kg/25 mm width) | — | — | 18 |
| Bending resistance | — | — | Partial peeling |
| Volume resistivity (ohm-cm) | — | — | $7.0 \times 10^{14}$ |
| Breakdown voltage (kV) | — | — | 8 |

TABLE 2

| | This Invention Example 2 | | | Comparison Example 2 |
|---|---|---|---|---|
| Fluid silicone rubber composition (II) (parts) | 100 | 95 | 90 | 100 |
| Xylene (parts) | — | 5 | 10 | — |
| Viscosity, Pa.s | 3000 | 200 | 100 | 3000 |
| Dissolution time (hrs) | — | instant | instant | — |
| Coatability | good | good | good | — |
| Rubber sheet thickness (mm) | 0.20 | 0.20 | 0.20 | 0.20 |
| Coating operations (times per surface) | 1 | 2 | 3 | — |
| Tensile strength (kg/25 mm width) | 25 | 26 | 22 | 0.28 |
| Bending resistence | No peeling | No peeling | No peeling | — |
| Volume resistivity (ohm-cm) | $6.0 \times 10^{14}$ | $6.5 \times 10^{14}$ | $6.2 \times 10^{14}$ | $5.8 \times 10^{14}$ |
| Breakdown voltage (kV) | 8 | 9 | 9 | 8 |
| Thermal resistivity °C./w | 0.65 | 0.60 | 0.60 | 0.66 |

TABLE 3-continued

|  | Comparison Example 3 | Comparison Example 4 | Comparison Example 5 |
|---|---|---|---|
| Thermal resistivity °C./w | — | — | 0.62 |

*The following problem occurred: in attempting the dissolution of the above-mentioned composition (III), the metal stirring blade was significantly abraded due to the lengthy agitation process with the result that the entire solution became blackish.

EXAMPLE 3

A fluid silicone rubber composition (IV) and then an electrically insulating and thermally radiating rubber sheet were produced by the methods of Example 1 with the exception that a dimethylvinylsilyl-terminated polymethyl(3,3,3-trifluoropropylsiloxane (viscosity, 10 Pa·s) was used instead of the dimethylsiloxane-methylvinylsiloxane-methylphenylsiloxane copolymer of Example 1 and methyl ethyl ketone was used instead of toluene.

The data on the production process and the properties of the electrically insulating and thermally radiating rubber sheet products are reported in Table 4.

TABLE 4

|  | This Invention Example 3 |  |
|---|---|---|
| Fluid silicone rubber composition (IV) (parts) | 100 | 95 |
| Methyl ethyl ketone (parts) | — | 5 |
| Viscosity, Pa.s | 1200 | 190 |
| Dissolution time (hrs) | — | instant |
| Coatability | good | good |
| Rubber sheet thickness (mm) | 0.30 | 0.30 |
| Coating operations (times per surface) | 1 | 2 |
| Tensile strength (kg/25 mm width) | 29 | 31 |
| Bending resistance | No peeling | No peeling |
| Volume resistivity (ohm-cm) | $2.2 \times 10^{14}$ | $2.3 \times 10^{14}$ |
| Breakdown voltage (kV) | 8 | 8 |
| Thermal resistivity, °C./w | 0.84 | 0.82 |

That which is claimed:

1. A method for manufacturing a rubber sheet which is electrically insulating and thermally radiating, comprising treating a network insulating material with an alkoxysilane, then coating the resulting network insulating material with a fluid silicone rubber composition, and then curing said composition, where the fluid silicone rubber composition consists essentially of (a) 100 parts by weight of a polyorganosiloxane having a viscosity at 25° C. of from 0.1 to 100 Pa·s and having an average unit formula $$R_a R_b' SiO_{(4-a-b)/2}$$

wherein each R represents a monovalent hydrocarbon radical free of aliphatic unsaturation or a halogenated monovalent hydrocarbon radical free of aliphatic unsaturation, each R' represents a monovalent aliphatically unsaturated hydrocarbon radical, a has a value from 1.90 to 2.05, b has a value from 0.005 to 0.1, and the sum of a+b has a value from 1.91 to 2.06, (b) a polyorganohydrogensiloxane having a viscosity at 25° C. of 0.007 to 5 Pa·s and having an average unit formula $$R_c H_d SiO_{(4-c-d)/2}$$

wherein R is defined above, the sum of c+d has a value of 1.001 to 3, there is at least two silicon-bonded hydrogen atoms per molecule, and said polyorganohydrogensiloxane is present in an amount such that there are 0.5 to 10 equivalents of silicon-bonded hydrogen atoms per equivalent of aliphatically unsaturated hydrocarbon radical in (a), (c) from 100 to 500 parts by weight of alumina powder, and (d) a catalytic quantity of a platinum-group compound as a catalyst.

2. The method in accordance with claim 1 in which the alkoxysilane is selected from the groups consisting of tetraalkoxysilane, organotrialkoxysilane, and diroganodialkoxysilane.

3. The method in accordance with claim 2 in which the alkoxysilane is organotrialkoxysilane.

4. The method in accordance with claim 3 in which the organotrialkoxysilane is gamma-methacryloxypropyltrimethoxysilane.

5. The method in accordance with claim 3 in which the organotrialkoxysilane is vinyltrimethoxysilane.

6. The method in accordance with claim in which the network insulating material is treated with a mixture of the alkoxysilane and an organotitanic acid ester.

7. The method in accordance with claim 6 in which the alkoxysilane is vinyltrimethoxysilane and the organotitanic acid ester is tetrabutyltitanate.

8. The method in accordance with claim 1 in which the polyorganosiloxane of (a) has viscosity in the range of 0.2 to 50 Pa·s, the alumina powder is present in an amount of 200 to 350 parts by weight, and (d) is a platinum-compound and is present in an amount such that the platinum metal is 1 to 800 ppm based on (a), (b), and (c).

9. The method in accordance with claim 8 in which the polyorganosiloxane of (a) is a methylphenylvinylsilyl terminated copolymer of dimethylsiloxane units, methylvinylsiloxane units, and methylphenylsiloxane units.

10. The method in accordance with claim 8 in which the polyorganosiloxane of (a) is a dimethylvinylsilyl terminated copolymer of dimethylsiloxane units and methylvinylsiloxane units.

11. The method in accordance with claim 8 in which the polyorganosiloxane of (a) is a dimethylvinylsilyl terminated polymethyl(3,3,3-trifluoropropyl)siloxane.

12. An electrically insulating and thermally radiating rubber sheet prepared in accordance with the method of claim 1.

13. An electrically insulating and thermally radiating rubber sheet prepared in accordance with the method of claim 8.

14. An electrically insulating and thermally radiating rubber sheet prepared in accordance with the method of claim 9.

15. An electrically insulating and thermally radiating rubber sheet prepared in accordance with the method of claim 10.

16. An electrically insulating and thermally radiating rubber sheet prepared in accordance with the method of claim 11.

17. The method in accordance with claim 1 in which the akoxysilane is mixed with organotetanic acid ester in an organic solvent solution where the combined weight of the alkoxysilane and the organotitanic acid ester is from 5 to 30 weight percent of the solution and the network insulating material is dried after being treated with the alkoxysilane.

18. The method in accordance with claim 17 in which the alkoxysilane is vinyltrimethoxysilane, the organotitanic acid ester is tetrabutyltitanate, the organic solvent is xylene, and the network insulating material is glass cloth.

19. An electrically insulating and thermally radiating rubber sheet prepared in accordance with the method of claim 17.

* * * * *

UNITED STATES PATENT AND TRADEMARK OFFICE
CERTIFICATE OF CORRECTION

PATENT NO. : 4,448,840

DATED : May 15, 1984

INVENTOR(S) : Takao Matsushita

It is certified that error appears in the above-identified patent and that said Letters Patent is hereby corrected as shown below:

In column 1, line 19, "electric-insulting" should read -- electric-insulating --.

In column 2, line 21 and column 9, line 62, "0.005" should read -- 0.0005 --.

In column 2, line 56, "$RR_2'$" should read -- $RR'_2$ --.

In column 3, line 37, "usefful" should read -- useful --.

In column 5, line 23, "3,3,3-trichloroethane" should read -- 1,1,1-trichloroethane --.

In column 9, line 16, "(3,3,3-trifluoropropylsiloxane" should read -- (3,3,3-trifluoropropyl)siloxane --.

In column 9, line 65, "0.007" should read -- 0.0007 --.

In column 10, line 25, "claim in" should read -- claim 1 in --.

In column 10, line 66, "organotetanic" should read -- organotitanic --.

UNITED STATES PATENT AND TRADEMARK OFFICE
CERTIFICATE OF CORRECTION

PATENT NO. : 4,448,840　　　　　　　　　　　　　Page 2 of 2

DATED : May 15, 1984

INVENTOR(S) : Takao Matsushita

It is certified that error appears in the above-identified patent and that said Letters Patent is hereby corrected as shown below:

The following letters should be in italics or underscored with a single line:

```
Column 2,  line 20, "a" before "has".
Column 2,  line 21, "b" before""has".
Column 2,  line 22, "a" and "b" in "a+b".
Column 2,  line 28, "c" and "d" in "c+d".
Column 9,  line 61, "a" before "has".
Column 9,  line 61, "b" after "2.05".
Column 9,  line 62, "a" and "b" in "a+b".
Column 10, line 1,  "c" and "d" in "c+d".
```

Signed and Sealed this

Twenty-sixth Day of March 1985

[SEAL]

Attest:

DONALD J. QUIGG

Attesting Officer　　　Acting Commissioner of Patents and Trademarks